United States Patent
Oh et al.

(10) Patent No.: US 9,843,634 B2
(45) Date of Patent: Dec. 12, 2017

(54) METHOD AND APPARATUS FOR SYNCHRONIZING CONTENT DIRECTORY SERVICE OBJECTS OF UNIVERSAL PLUG AND PLAY MEDIA SERVERS

(75) Inventors: Seung-jae Oh, Seoul (KR); Se-hee Han, Seoul (KR); Won-seok Kwon, Suwon-si (KR); Joo-yeol Lee, Seoul (KR); Dong-shin Jung, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 1126 days.

(21) Appl. No.: 11/758,896

(22) Filed: Jun. 6, 2007

(65) Prior Publication Data

US 2008/0077668 A1   Mar. 27, 2008

Related U.S. Application Data

(60) Provisional application No. 60/846,106, filed on Sep. 21, 2006.

(30) Foreign Application Priority Data

Nov. 30, 2006   (KR) .................... 10-2006-0120068

(51) Int. Cl.
  *G06F 15/16*   (2006.01)
  *H04L 29/08*   (2006.01)
  *H04L 12/28*   (2006.01)

(52) U.S. Cl.
  CPC ...... *H04L 67/1095* (2013.01); *H04L 12/2803* (2013.01); *H04L 12/2812* (2013.01)

(58) Field of Classification Search
  CPC ............. H04L 12/2803; H04L 12/2812; H04L 67/1095

USPC ............... 709/201-203, 217, 227-228, 248; 719/318, 330
See application file for complete search history.

(56) References Cited

U.S. PATENT DOCUMENTS

| 6,125,369 | A  | * | 9/2000 | Wu ................... G06F 17/30578 707/613 |
| 6,928,467 | B2 | * | 8/2005 | Peng .................... G06F 12/121 707/999.104 |
| 7,089,307 | B2 | * | 8/2006 | Zintel et al. .................. 709/224 |
| 7,725,431 | B2 | * | 5/2010 | Myllyla et al. ............... 707/610 |

(Continued)

FOREIGN PATENT DOCUMENTS

| EP | 1862919 A1 | 12/2007 |
| JP | 2001-346144 A | 12/2001 |

(Continued)

OTHER PUBLICATIONS

Presser et al., "ContentDirectory:2 Service Template Version 1.01", May 31, 2006, <http://www.upnp.org/specs/av/UPnP-av-ContentDirectory-v2-Service-20060531.pdf>.*

(Continued)

*Primary Examiner* — Christopher Biagini
(74) *Attorney, Agent, or Firm* — Sughrue Mion, PLLC

(57) ABSTRACT

Provided is a method of synchronizing content directory service (CDS) objects of a universal plug and play (UPnP) media servers. The UPnP media servers manage information on synchronization objects and synchronization policy information, which reduces the role of a control point (CP) in performing synchronization, so that the synchronization speed is increased.

14 Claims, 7 Drawing Sheets

(56) References Cited

U.S. PATENT DOCUMENTS

| | | | |
|---|---|---|---|
| 7,739,411 B2* | 6/2010 | Messer | H04L 67/1095 709/201 |
| 7,925,698 B2* | 4/2011 | Caspi et al. | 709/204 |
| 2002/0078256 A1* | 6/2002 | Gehman et al. | 709/318 |
| 2003/0217136 A1* | 11/2003 | Cho et al. | 709/223 |
| 2004/0139180 A1* | 7/2004 | White et al. | 709/221 |
| 2004/0193609 A1* | 9/2004 | Phan | H04L 12/2803 |
| 2004/0221007 A1* | 11/2004 | Roe et al. | 709/203 |
| 2005/0021866 A1* | 1/2005 | Kang et al. | 709/248 |
| 2005/0027755 A1* | 2/2005 | Shah | G06F 3/0605 |
| 2005/0055352 A1* | 3/2005 | White | H04L 29/06 |
| 2005/0135341 A1* | 6/2005 | Kim | 370/352 |
| 2005/0204065 A1* | 9/2005 | Son et al. | 709/248 |
| 2005/0262520 A1* | 11/2005 | Burnett | G06F 21/10 719/320 |
| 2005/0267946 A1* | 12/2005 | An et al. | 709/217 |
| 2006/0004576 A1* | 1/2006 | Kishida | 704/258 |
| 2006/0041596 A1* | 2/2006 | Stirbu | G06F 17/30017 |
| 2006/0041924 A1 | 2/2006 | Bushmitch et al. | |
| 2006/0168000 A1* | 7/2006 | Bodlaender | 709/205 |
| 2006/0194549 A1* | 8/2006 | Janik | G06F 17/30749 455/73 |
| 2007/0100983 A1* | 5/2007 | Takasaki et al. | 709/223 |
| 2008/0005184 A1* | 1/2008 | Myllyla et al. | 707/200 |
| 2008/0077668 A1 | 3/2008 | Oh et al. | |
| 2008/0235191 A1* | 9/2008 | Dijk et al. | 707/3 |

FOREIGN PATENT DOCUMENTS

| | | |
|---|---|---|
| JP | 2007-510195 A | 4/2007 |
| JP | 2007-519082 A | 7/2007 |
| KR | 1020030035194 A | 5/2003 |
| KR | 2003-0095897 A | 12/2003 |
| KR | 10-2004-0013465 A | 2/2004 |
| KR | 10-2004-0055446 A | 6/2004 |
| KR | 10-2005-0062849 A | 6/2005 |
| KR | 10-2007-0069800 A | 7/2007 |
| KR | 10-0902505 B1 | 6/2009 |
| WO | 2004/090753 A1 | 10/2004 |
| WO | 2005/031607 A1 | 4/2005 |
| WO | 2005/043408 A1 | 5/2005 |
| WO | 2006/066052 A2 | 6/2006 |

OTHER PUBLICATIONS

Ritchie et al., "UPnP AV Architecture:0.83", Jun. 12, 2002, <http://alperakcan.org/projects/upnpavd/down/UPnPAvArchtiecture0.83.pdf>.*

Office Action issued Feb. 27, 2012 in corresponding Korean application No. 10-2008-0045109.

Communication, dated Jul. 30, 2013, issued by the Japanese Patent Office in counterpart Japanese Patent Application No. 2012-529126.

Communication dated Jan. 8, 2013, issued by the Japanese Patent Office in counterpart Japanese Application No. 2009-529126.

European Search Report dated Oct. 23, 2013, issued by the European Patent Office in corresponding Application No. 07808408.4.

Communication dated Feb. 17, 2017, issued by the European Patent Office in counterpart European Application No. 07808408.4.

* cited by examiner

FIG. 5

```
<policy>
        <delProtection>true | false</delProtection>

<!-- representation #1 -->
        <type>replace</type>
        <role>source</role>

<type>merge</type>
        <precedence>1</precedence>

<!-- representation #2-->
        <role> source | sink | precedence_partner | partner<role/>

<!-- representation #3-->
        <replace>Source | Sink</replace>
        <merge>precedence | no precedence</merge>

</policy>
```

FIG. 6A

```
<policy>
    <delProtection>true</delProtection>
    <type>replace</type>
    <role>source</role>
</policy>
```

```
<policy>
    <delProtection>true</delProtection>
    <type>replace</type>
    <role>sink</role>
</policy>
```

FIG. 6B

\<element 1\>ABC\</element 1\>
\<element 2\>DEF\</element 2\>

↓

\<element 1\>XYZ\</element 1\>
\<element 2\>\</element 2\>

\<element 1\>ABC\</element 1\>
\<element 2\>DEF\</element 2\>

↓

\<element 1\>ABC\</element 1\>
\<element 2\>LMN\</element 2\>

↓

\<element 1\>XYZ\</element 1\>
\<element 2\>\</element 2\>

FIG. 7A

```
<policy>
    <delProtection>true</delProtection>
    <type>merge</type>
    <precedence>1</precedence>
</policy>
```

```
<policy>
    <delProtection>true</delProtection>
    <type>merge</type>
    <precedence>0</precedence>
</policy>
```

FIG. 7B

```
<element 1>ABC</element 1>
<element 2>DEF</element 2>
<element 3>GHI</element 3>
```
↓
```
<element 1>XYZ</element 1>
<element 2>DEF</element 2>
<element 3>OPQ</element 3>
```
↓
```
<element 1>XYZ</element 1>
<element 2>KLM</element 2>
<element 3>OPQ</element 3>
```

```
<element 1>ABC</element 1>
<element 2>DEF</element 2>
<element 3>GHI</element 3>
```
↓
```
<element 1>ABC</element 1>
<element 2>KLM</element 2>
<element 3>TUV</element 3>
```
↓
```
<element 1>XYZ</element 1>
<element 2>KLM</element 2>
<element 3>OPQ</element 3>
```

Ⓐ1
```
<policy>
    <delProtection>false</delProtection>
    <type>merge</type>
    <precedence>1</precedence>
</policy>
```

Ⓐ1 Not Deleted
Removed from the pairing

Ⓑ1 Deleted
```
<policy>
    <delProtection>false</delProtection>
    <type>merge</type>
    <precedence>0</precedence>
</policy>
```

Ⓑ1

METHOD AND APPARATUS FOR SYNCHRONIZING CONTENT DIRECTORY SERVICE OBJECTS OF UNIVERSAL PLUG AND PLAY MEDIA SERVERS

CROSS-REFERENCE TO RELATED PATENT APPLICATIONS

This application claims the benefit of U.S. Provisional Patent Application No. 60/846,106 filed on 21 Sep. 2006 in the U.S. Patent Trademark Office, and the benefit of Korean Patent Application No. 10-2006-0120068 filed on 30 Nov. 2006, in the Korean Intellectual Property Office, the disclosures of which are incorporated herein in their entirety by reference.

BACKGROUND OF THE INVENTION

1. Field of the Invention

Methods and apparatuses consistent with the present invention relate to a universal plug and play (UPnP) network, and more particularly, to synchronizing content directory service (CDS) objects of UPnP media servers.

2. Description of the Related Art

Universal plug and play (UPnP), which is a protocol for sensing and controlling electrical appliances connected to a network, is noted as being a home networking standard. A UPnP AV (Audio/Video) architecture was developed for utilizing multimedia content, such as audio/video, etc., on the basis of the UPnP standard.

The UPnP AV architecture consists of a media server, a media renderer, and a control point (CP) for controlling the media server and the media renderer. The media server provides multimedia files through a content directory service, and the media renderer reproduces the multimedia files. The control point controls the media server and the media renderer so that they can operate by interacting with each other. If such a UPnP AV architecture is established, a plurality of media servers can exist in a home network, wherein the media servers can contain different contents. In the UPnP AV environment, a case where a user wants to easily synchronize contents distributed to different content directory services (CDSs), for example, a case where a user wants to synchronize his or her MP3 player with a home media center in order to enjoy music contents stored in the MP3 player at a high quality by using his or her home Hi-Fi apparatus, can occur.

FIG. 1 is a conceptual diagram schematically illustrating a conventional method of synchronizing CDS objects of UPnP media servers. A user selects devices that are to perform synchronization using a control point 100 and controls CDS 101 and CDS 102 that are respectively provided by the devices so as to transfer resources between the devices in order to perform synchronization.

FIG. 2 is a detailed flowchart illustrating the conventional method illustrated in FIG. 1. Referring to FIG. 2, the control point 100 selects two devices to perform synchronization, calls Browse( ) actions of the CDSs 101 and 102 provided by the two devices, and obtains two lists of contents (Operation 201) (reference numeral 201 not marked in FIG. 2), compares the two lists of contents of the devices, and determines which CDS object is added to, deleted from, or is to be changed in the two devices (202). Here, the CDS object includes all types of data entities that the CDSs 101 and 102 can return as a result of calling the Browse( ) action or a Search( ) action. Thus, the CDS object can be used to designate a resource binary indicating metadata of contents or the contents. Hereinafter the CDS object is referred to as the object for convenience of description.

The control point 100 deletes or adds the object using actions provided by the CDSs 101 and 102 of each device (Operations 203 and 204). More specifically, the control point 100 calls a CreateObject( ) action and an ImportResource( ) action of the CDSs 101 and 102 to which a new object is added in order to control two media servers to perform synchronization.

A DestroyObject( ) action and a DeleteResource( ) action are used to delete the object. An UpdateObject( ) action is used to modify metadata of the object.

As described above, when synchronization is performed using conventional UPnP technology, the control point 100 needs to be informed of content lists of both CDSs 101 and 102 in order to select an object that needs to be synchronized. Furthermore, since the control point 100 needs to manage a synchronization policy for each synchronization operation, a large amount of contents causes considerable load on a memory or central processing unit (CPU) of the control point 100.

Also, the more objects there are to be synchronized, the more frequently an action of a CDS is called, which produces a great amount of network traffic, causing a reduction in the synchronization speed.

SUMMARY OF THE INVENTION

The present invention provides a method and apparatus for synchronizing an object based on a certain synchronization policy using media servers without the intervention of a control point.

According to an aspect of the present invention, there is provided a method of synchronizing CDS (content directory service) objects between first and second media servers in an UPnP (universal plug and play) network, the method comprising: receiving synchronization relationship information including information on synchronization objects and synchronization policy information from one of control points (CPs) in the UPnP network; receiving a request to perform synchronization based on the synchronization relationship information from one of the CPs; and synchronizing the synchronization objects based on the synchronization policy information in response to the request.

The receiving of the request may comprise: receiving a call message for a certain synchronization action provided by a CDS of the first media server, wherein the call message includes a parameter distinguishing the synchronization relationship information from synchronization relationship information managed by the CDS of the first media server.

The synchronization policy information may include information indicating whether synchronization is performed based on one of the synchronization objects or the plurality of synchronization objects.

The synchronization policy information may further include information indicating which object has precedence if a conflict in modifications occurs when the synchronization is performed based on the plurality of synchronization objects.

The synchronization policy information may further include delete protection information indicating that the synchronization objects are not deleted even if at least one of the synchronization objects is deleted according to the synchronization relationship information.

The synchronizing first may apply synchronization policy information included in metadata of an object from among the synchronization objects in which the synchronization policy information is different from the synchronization relationship information.

According to another aspect of the present invention, there is provided a computer readable medium having recorded thereon a computer program for executing the method.

According to another aspect of the present invention, there is provided an apparatus for synchronizing CDS objects of media servers in an UPnP network, the apparatus comprising: a synchronization relationship information receiver receiving synchronization relationship information including information on synchronization objects and synchronization policy information from one of CPs; a synchronization request receiver receiving a request to perform synchronization based on the synchronization relationship information from one of the CPs; and a synchronization performing unit synchronizing the synchronization objects based on the synchronization policy information in response to the request.

BRIEF DESCRIPTION OF THE DRAWINGS

The above and other aspects and advantages of the present invention will become more apparent by describing in detail exemplary embodiments thereof with reference to the attached drawings in which:

FIG. 5 illustrates the structure of synchronization policy information according to an exemplary embodiment of the present invention;

FIGS. 6A and 6B are views for explaining a synchronization method according to an exemplary embodiment of the present invention;

FIGS. 7A and 7B are views for explaining a synchronization method according to another exemplary embodiment of the present invention;

DETAILED DESCRIPTION OF EXEMPLARY EMBODIMENTS OF THE INVENTION

Hereinafter, exemplary embodiments of the present invention will be described in detail with reference to the accompanying drawings.

Figure 1:
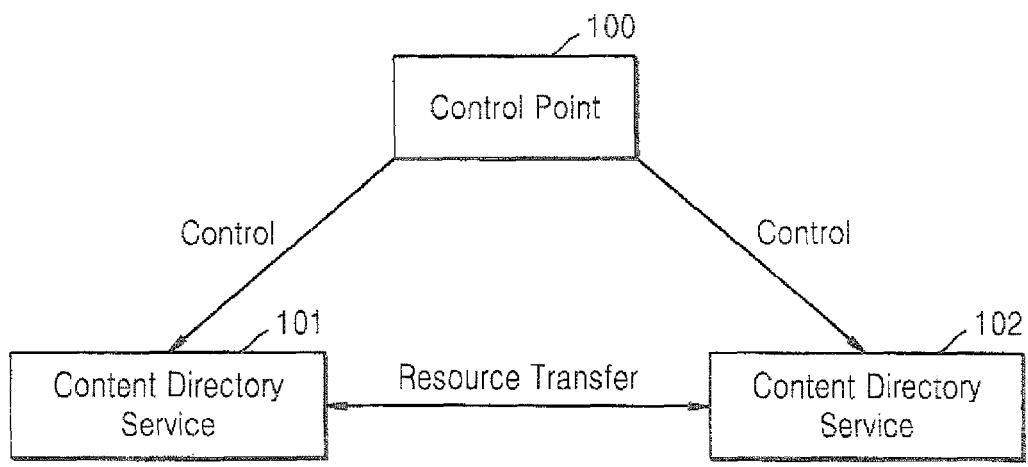
FIG. 1 is a conceptual diagram schematically illustrating a conventional method of synchronizing content directory service (CDS) objects of universal plug and play (UPnP) media servers.
Figure 2:
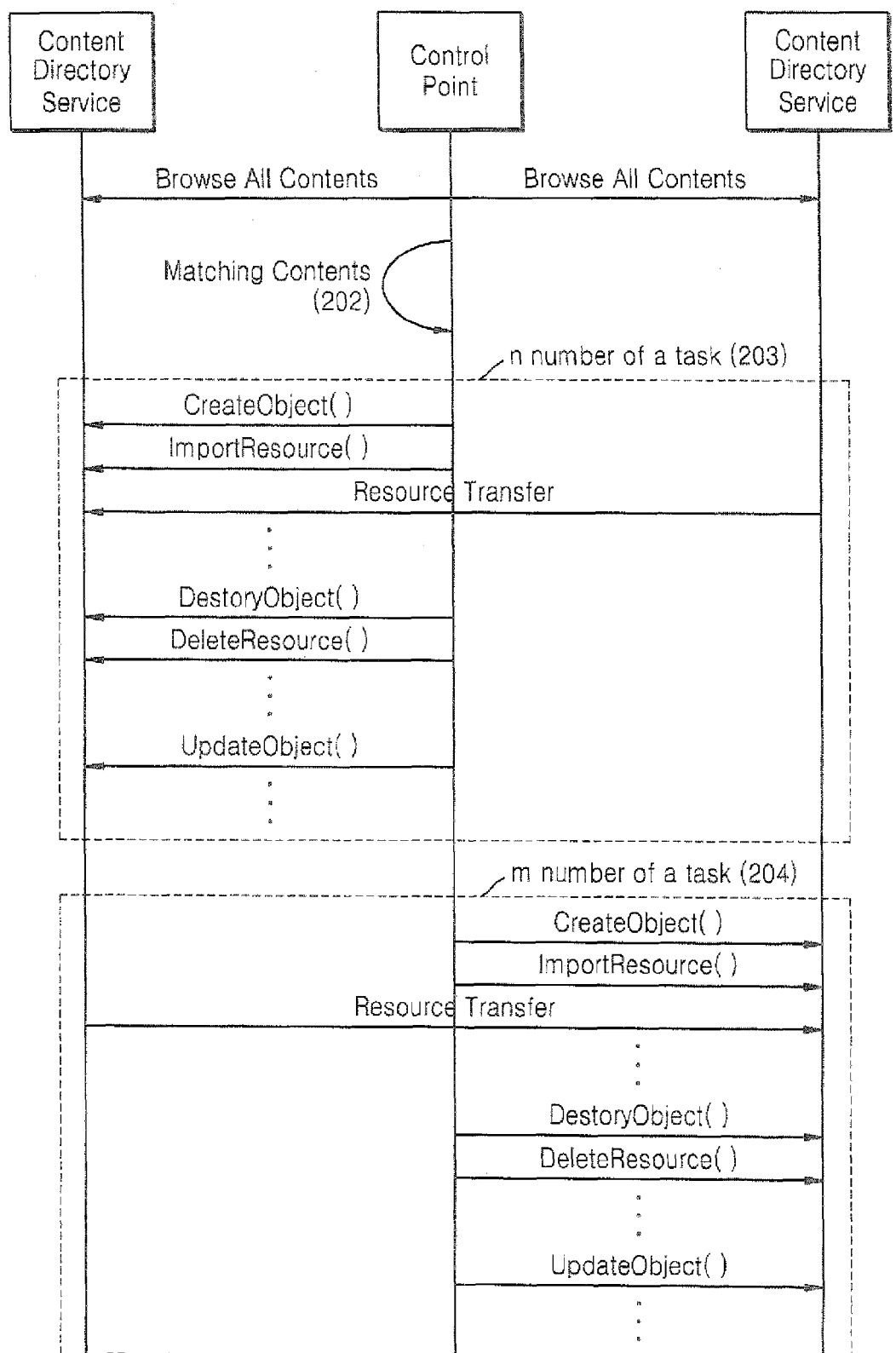
FIG. 2 is a detailed flowchart illustrating the conventional method illustrated in FIG. 1.
Figure 3:
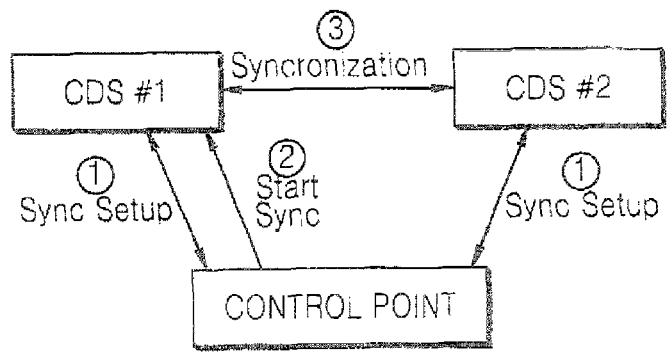
FIG. 3 is a view for explaining a synchronization method according to an exemplary embodiment of the present invention.

FIG. 3 is a view for explaining a synchronization method according to an exemplary embodiment of the present invention. Referring to FIG. 3, in order to synchronize objects managed by control directory services (CDSs) of two media servers, a control point (CP) performs synchronization setup. The synchronization setup (1) refers to a process of providing the two media servers with synchronization relationship information. The synchronization relationship information is required to synchronize objects between the two media servers, and includes information on a synchronization partner device regarding synchronization, information on objects that are to be synchronized, information on a synchronization policy, etc.

Generally, since one CDS manages a plurality of pieces of synchronization relationship information, each piece of synchronization relationship information may have a synchronization relationship information ID. If metadata of an object includes the synchronization relationship information ID of the object, the CDS can determine what type of synchronization is performed for what object only by using the synchronization relationship information ID designated by the control point. This is because the metadata of the object managed by the CDS includes the synchronization relationship information ID of the metadata and information on a synchronization object of the synchronization partner device.

If the synchronization setup is complete, the control point calls a synchronization action provided by a CDS of a first media server to trigger synchronization (2). A control message used to call the synchronization action includes a synchronization relationship information ID identifying one of the pieces of synchronization relationship information managed by the first media server as an argument. If the synchronization action is called, the CDS of the first media server and a CDS of a second media server exchange updated information on the basis of the synchronization relationship information, and then perform synchronization.

In the synchronization process, since the information on the synchronization policy defining how synchronization is performed is included in the synchronization relationship information, no instruction about what the control point does is required. A user can modify the information on the synchronization policy using the control point even after the synchronization setup is complete.

Meanwhile, the information on the synchronization policy can be included in the synchronization relationship information, or in the metadata of an object. The information on the synchronization policy included in the synchronization relationship information includes rules applied to a whole synchronization operation. The information on the synchronization policy included in the metadata of the object is exclusively applied to the object. Therefore, the information on the synchronization policy included in the synchronization relationship information is contradictory to the information on the synchronization policy included in the metadata of the object, the information on the synchronization policy included in the metadata of the object is first applied.

Figure 4:
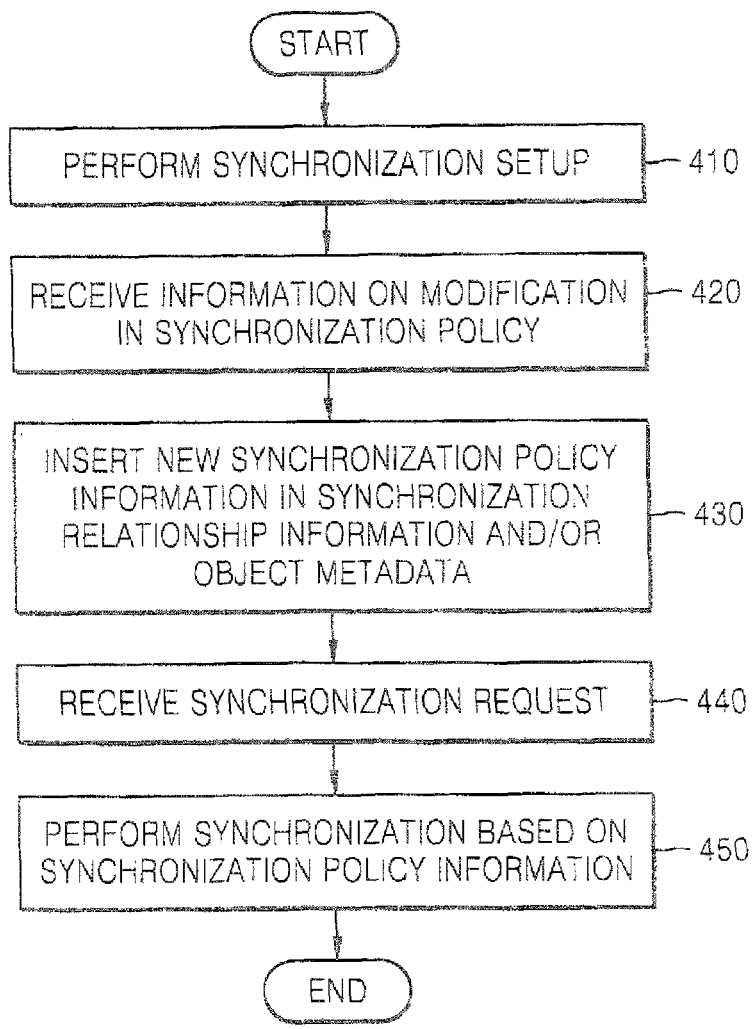
FIG. 4 is a flowchart illustrating a process where a media server synchronizes an object with an object of another media server according to an exemplary embodiment of the present invention.

FIG. 4 is a flowchart illustrating a process where a media server synchronizes an object with an object of another media server according to an exemplary embodiment of the present invention. Referring to FIG. 4, the media server performs synchronization setup and receives synchronization relationship information from a control point (Operation 410). In operation 410, the control point calls a certain action of a CDS. As described in the previous exemplary embodiment, the synchronization relationship information includes information on a synchronization partner device, information on a synchronization object, and information on a synchronization policy. Although not shown, respective synchronization information on an object can be transferred to the media server in operation 410.

The media server receives information on a change in the synchronization policy from the control point. In detail, a user can modify the synchronization policy using the control point at any time (Operation 420).

The media server inserts information on the synchronization policy into the synchronization relationship information and/or metadata of the object based on the information on the change in the synchronization policy (Operation 430).

The operations 420 and 430 of modifying the information on the synchronization policy are included in the present exemplary embodiment; however, these operations can be left out if necessary.

The media server receives a control message calling a synchronization action of the CDS from the control point (Operation 440). The control message includes a synchronization relationship information ID of a specific piece of synchronization relationship information.

The CDS browses synchronization relationship information based on the synchronization relationship information ID included in the control message, and performs synchronization according to the information on the synchronization policy included in the browsed synchronization relationship information (Operation 450). If the metadata of the synchronization object includes different information on the synchronization policy from the information on the synchronization policy included in the browsed synchronization relationship information, the CDS first applies the information on the synchronization policy included in the metadata.

FIG. 5 illustrates the structure of synchronization policy information according to an exemplary embodiment of the present invention. Referring to FIG. 5, the structure of the synchronization policy information is in the format of extensible markup language (XML). The synchronization policy information can include delete protection information. A value of true or false in a <delProtection> tag is established in order to protect the deletion of an object by synchronization.

Replace synchronization and merge synchronization are used to determine a synchronization object on which synchronization is based from among a plurality of synchronization objects. The replace synchronization is based on one of the synchronization objects, whereas the merge synchronization is based on all of the synchronization objects. In more detail, the replace synchronization reflects a modification made in one of the synchronization objects, whereas the merge synchronization reflects a modification made in all of the synchronization objects.

When the modification made in all of the synchronization objects is reflected according to the merge synchronization, a conflict occurs. For example, a modification in the same element is made in two synchronization objects. Since one of the two synchronization objects on which synchronization is based is determined, the synchronization policy information may have precedent information according to the merge synchronization.

Three types of synchronization representation are used in the present exemplary embodiment. A media server including the synchronization policy information is referred to as a first device. A partner device is referred to as a second device.

In a first type of synchronization representation, the type of synchronization is indicated by a <type> tag, and the role of the first device is indicated by a <role> tag. One example is the replace synchronization where the first device serves as a source device. In detail, the second device serves as a sink device and an object of the first device replaces an object of the second device.

Another example is the merge synchronization where the first device has 1 as a value of precedence. In detail, when the conflict occurs, an object having higher precedence can be determined by comparing values of <precedence> tags.

In a second type of synchronization representation, a single line is used, and all information identifying this type of synchronization is included in the <role> tag. Since the terms of source or sink are used in the replace synchronization, information on one of these two terms includes the type of synchronization and the role of the first device. If a value of the <role> tag is "precedence_partner", the type of synchronization is the merge synchronization, and the first device has precedence when the conflict occurs. If the value of the <role> tag is "partner", the type of synchronization is the merge synchronization, and the second device has precedence when the conflict occurs.

In a third type of synchronization representation, the type of tag is determined based on the type of synchronization. In the replace synchronization, "source" or "sink" is used as the value of the tag. In the merge synchronization, "precedence" or "no_precedence" is used as the value of the tag.

FIGS. 6A and 6B are views for explaining a synchronization method according to an exemplary embodiment of the present invention. Referring to FIG. 6A, synchronization policy information includes delete protection information and information on the replace synchronization.

Referring to FIG. 6B, an object A1 of a source device and an object B1 of a sink device are synchronized based on the synchronization policy information shown in FIG. 6A. In a first synchronization operation, the object B1 corresponding to the object A1 of the source device is generated in the sink device. Then, DEF which is a value of <element2> of the object A1 is deleted. In a second synchronization operation, a modification in the object A1 is reflected in the object B1 of the sink device so that a value of <element2> of the object B1 is deleted.

FIGS. 7A and 7B are views for explaining a synchronization method according to another exemplary embodiment of the present invention. Referring to FIG. 7A, synchronization policy information includes delete protection information and information on the merge synchronization.

Referring to FIG. 7B, an object A1 of a source device and an object B1 of a sink device are synchronized based on the synchronization policy information shown in FIG. 7A. After previous synchronization is performed, <element1> and <element3> of the object A1 are modified, and <element2> and <element3> of the object B1 are modified. Since the merge synchronization is performed, a value of <element2> of the object A1 is the same as that of <element2> of the object B1, and a value of <element1> of the object B1 is the same as that of <element1> of the object A1.

However, when the <element1> of the objects A1 and B1 is modified, a conflict occurs. Since the object A1 has precedence based on the synchronization policy information shown in FIG. 7A, a value of <element3> of the object B1 is the same as that of <element3> of the object A1.

Figures 8, 9:
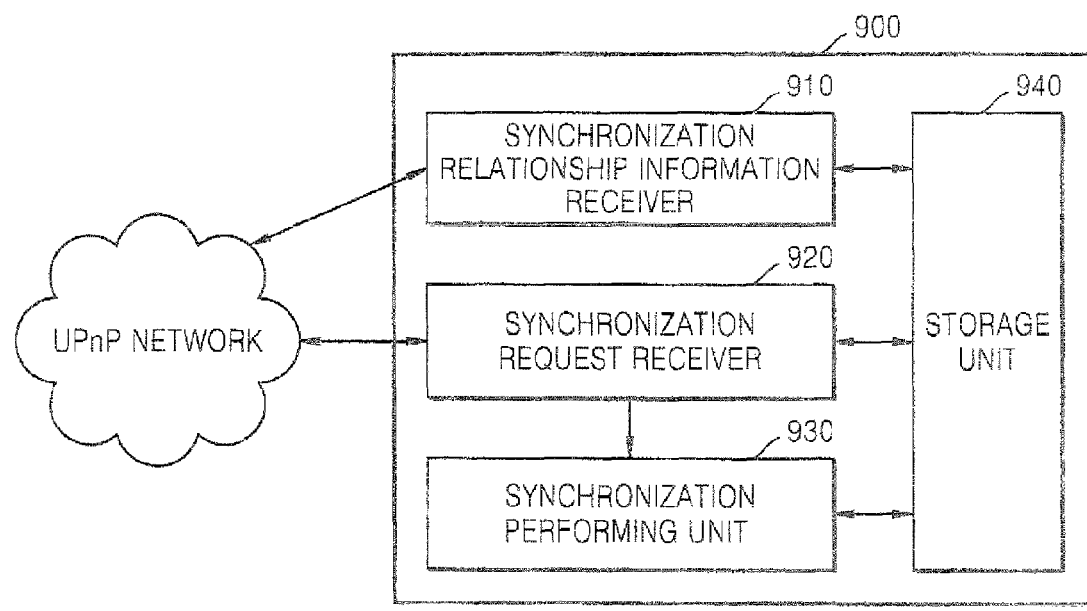
FIG. 8 is a view for explaining a synchronization method according to another exemplary embodiment of the present invention.
FIG. 9 is a block diagram of an apparatus for performing a synchronization method according to an exemplary embodiment of the present invention.

FIG. 8 is a view for explaining a synchronization method according to another exemplary embodiment of the present invention. Referring to FIG. 8, A1 and B1 indicate synchronization objects and the merge synchronization is used. If no modification is made in the object A1 and the object B1 is deleted, since the deletion is a modification made in the object B1, and a value of <delprotection> of the synchronization policy information is "false", the modification is reflected in the object A1 and thus the object A1 is also deleted.

However, if a modification is made in the object A1, since a conflict occurs, the object A1 is not deleted. In this case, since both objects A1 and B1 are modified, and the object A1 has precedence based on the synchronization policy information, the object A1 is not deleted.

FIG. 9 is a block diagram of an apparatus 900 for performing a synchronization method according to an exemplary embodiment of the present invention. Referring to FIG. 9, the apparatus 900 includes a synchronization relationship information receiver 910, a synchronization request receiver 920, a synchronization performing unit 930, and a storage unit 940.

The synchronization relationship information receiver 910 is a module performing synchronization module. In more detail, the synchronization relationship information receiver 910 receives every piece of synchronization relationship information from a control point. The synchronization relationship information includes information on synchronization objects and synchronization policy information. If the synchronization relationship information is identified, it can be determined what objects are synchronized based on which synchronization policy.

The synchronization request receiver 920 receives a control message for calling a synchronization action of a CDS from the control point. The control message includes a synchronization relationship information ID.

The synchronization performing unit 930 synchronizes synchronization objects based on the synchronization relationship information corresponding to the received synchronization relationship information ID. In more detail, the synchronization performing unit 930 determines objects having the synchronization relationship information ID as metadata as the synchronization objects, and determines synchronization objects of a partner device based on the determined synchronization objects. Synchronization is based on the synchronization policy information included in the synchronization relationship information. However, if the synchronization policy information is included in the metadata of the synchronization objects, the synchronization policy information included in the metadata is first applied.

Meanwhile, the invention can also be embodied as computer readable codes on a computer readable recording medium. The computer readable recording medium is any data storage device that can store data which can be thereafter read by a computer system. Examples of the computer readable recording medium include read-only memory (ROM), random-access memory (RAM), CD-ROMs, magnetic tapes, floppy disks, and optical data storage devices.

According to the present invention, since UPnP media servers manage synchronization objects and synchronization policy information, a control point manages less information and calls less actions of CDSs during a synchronization process than others, so that the synchronization speed of is increased.

While the present invention has been particularly shown and described with reference to exemplary embodiments thereof, it will be understood by those of ordinary skill in the art that various changes in form and details may be made therein without departing from the spirit and scope of the present invention as defined by the following claims.

What is claimed is:

1. A method of synchronizing, in a universal plug and play (UPnP) network, a first content directory service (CDS) of a first device with a second CDS of a second device, the first device pre-storing a plurality of relationship identifiers (IDs) and pre-storing, corresponding to each relationship ID, synchronization relationship information indicating the second device as a partner device for synchronization, one or more objects that are to be synchronized with the second CDS, and a synchronization policy to be applied to the synchronization, the method comprising:

receiving by the first device a control message including a relationship ID corresponding to one of the pre-stored synchronization relationship information from a control point (CP) in the UPnP network; and in response to the control message, the first device performs synchronization directly with the second device, of the one or more synchronization objects using the synchronization policy according to synchronization relationship information indicated by the received relationship ID.

2. The method of claim 1, wherein the synchronization policy comprises information indicating whether synchronization is performed based on one of the synchronization objects or a plurality of the synchronization objects.

3. The method of claim 2, wherein the synchronization policy comprises information indicating which object has precedence if a conflict in modifications occurs when the synchronization is performed based on the plurality of the synchronization objects.

4. The method of claim 1, wherein the synchronization policy comprises delete protection information indicating that the synchronization objects are not deleted even if at least one of the synchronization objects is deleted according to the synchronization relationship information.

5. The method of claim 1, wherein the synchronization first applies a synchronization policy included in metadata of an object from among the synchronization objects in which the synchronization policy is different from the synchronization policy indicated in the synchronization relationship information.

6. A non-transitory computer readable medium having recorded thereon a computer program for executing the method of claim 1.

7. A content directory service (CDS) apparatus for synchronizing CDS objects in a universal plug and play (UPnP) network, the CDS apparatus comprising:

a storage unit that pre-stores a plurality of relationship identifiers (IDs) and pre-stores, corresponding to each relationship ID, synchronization relationship information indicating a partner device including a partner CDS for synchronization, one or more objects that are to be synchronized with the partner CDS, and a synchronization policy to be applied to the synchronization;

a central processing unit configured to function as:

a synchronization request receiver that receives a control message including a relationship ID corresponding to one of the pre-stored synchronization relationship information from a control point (CP) in the UPnP network; and a synchronization performing unit that, in response to the control message, performs synchronization directly with the partner device of the one or more synchronization objects using the synchronization policy according to synchronization relationship information indicated by the received relationship ID.

8. The apparatus of claim 7, wherein the synchronization policy comprises information indicating whether synchronization is performed based on one of the synchronization objects or a plurality of the synchronization objects.

9. The apparatus of claim 8, wherein the synchronization policy comprises information indicating an object having precedence if a conflict in modifications occurs when the synchronization is performed based on the plurality of the synchronization objects.

10. The apparatus of claim 7, wherein the synchronization policy comprises delete protection information indicating that the synchronization objects are not deleted even if at least one of the synchronization objects is deleted according to the synchronization relationship information.

11. The apparatus of claim 7, wherein the synchronization performing unit first applies a synchronization policy included in metadata of an object from among the synchronization objects in which the synchronization policy is different from the synchronization policy included in the synchronization relationship information.

12. The method of claim 1, further comprising receiving a modification of one of the pre-stored synchronization relationship information from a CP, and updating the pre-stored synchronization relationship information with the modification.

13. The method of claim 1, wherein the synchronization policy includes delete protection or precedent information used in synchronizing the synchronization objects.

14. The method of claim 1, wherein at least one synchronization object includes a synchronization policy included in metadata, the synchronization policy applying only to the synchronization object containing the metadata and, during synchronization, the synchronization policy indicated in the metadata is applied before the synchronization policy included in the pre-stored synchronization relationship information.

* * * * *